United States Patent [19]
Campbell et al.

[11] 3,934,393
[45] Jan. 27, 1976

[54] BREAKAWAY MECHANISM FOR AN IMPROVED CROP MATERIAL ROLL FORMING MACHINE

[75] Inventors: Willis R. Campbell, Ephrata; William F. Ostergren, Terre Hill, both of Pa.

[73] Assignee: Sperry Rand Corporation, New Holland, Pa.

[22] Filed: Sept. 20, 1974

[21] Appl. No.: 507,822

Related U.S. Application Data

[63] Continuation-in-part of Ser. No. 405,977, Oct. 12, 1973, abandoned.

[52] U.S. Cl. .................................................. 56/341
[51] Int. Cl.² ......................................... A01D 39/00
[58] Field of Search ........ 56/341, 342, 343; 100/88, 100/89

[56] References Cited
UNITED STATES PATENTS

2,096,990  10/1937  Luebben ............................. 100/88
2,581,542  1/1952  Kolzing ......................... 56/341 UX
3,722,197  3/1973  Vermeer .............................. 56/341

*Primary Examiner*—Hugh R. Chamblee
*Attorney, Agent, or Firm*—John R. Flanagan; Frank A. Seemar; Joseph A. Brown

[57] ABSTRACT

A breakaway mechanism mounted on the frame of an improved crop material roll forming machine engages a take-up and expansion member to cause the member to initially retain an upper flexible, roll-forming apron substantially in a contracted position as crop material, being initially rolled to form a core at a roll-forming area defined between the upper apron and a lower crop-conveying and roll-forming apron, builds to a desired predetermined density. The breakaway mechanism will release its engagement with the take-up member when the core of crop material reaches the desired predetermined density.

6 Claims, 7 Drawing Figures

BREAKAWAY MECHANISM FOR AN IMPROVED CROP MATERIAL ROLL FORMING MACHINE

BACKGROUND OF THE INVENTION

This application is a Continuation-In-Part of copending U.S. patent application Ser. No. 405,977, filed Oct. 12, 1973, now abandoned.

The present invention relates generally to a machine for forming a roll of forage crop material, such as hay or the like, and more particularly to an improvement for the machine which insures that an initial core of hay is formed having a desired predetermined density.

For many years, it has been customary to harvest forage crops by mowing the crops, letting them dry in the field, forming the dried crop into windrows, gathering the crops in windrowed form by a baler and forming the gathered crop material into rectangular bales.

Recently it has been found that by forming the crop material into large compact rolls of material, rather than rectangular bales as previously done, the material in roll form could be deposited and left in the field because the roll of material tends to provide a self-shedding protective covering from inclement weather. Since the roll can be left in the field the additional steps of gathering the rectangular bales and transporting the gathered bales to a storage area away from the elements can be eliminated.

Several methods for the forming of compact rolls of material have been devised throughout the years. One of these methods comprises rolling the swath or windrow of material along the ground until a roll of desired size is obtained. Another, and more successful method comprises utilizing a machine by which the swath or windrow of material is picked up from the field and directed onto a lower conveying apron. The lower apron transports the material in one direction while an upper apron, usually positioned above and adjacent the lower apron, moves in an opposite direction and simultaneously engages the crop material being carried by the lower apron to thereby coil or wind the crop material into a circular roll.

Some difficulty has been encountered in obtaining a roll having a satisfactory density when utilizing a roll forming machine of this general type. Much of this difficulty has centered around the inability to form an initial core of material having a desired predetermined density which provides a relatively solid core of material about which the remainder of the material forming the final roll may be wound.

OBJECTS AND SUMMARY OF THE INVENTION

It is a principle object of the present invention, therefore, to form an initial core of material having a desired predetermined density which provides a solid foundation about which to coil or wind the remainder of the crop material forming the compact roll.

It is another object of the present invention to provide a breakaway mechanism for an improved roll forming machine which insures that the initial core of material is formed having the desired predetermined density.

Still another object of the present invention is to provide a breakaway mechanism which automatically resets after each hay roll has been formed and ejected from the machine.

A further object of the present invention is to provide a breakaway mechanism capable of being adjusted whereby the desired predetermined density may be varied according to the operator's wishes and the type of crop material being rolled.

A still further object of the present invention is to provide a breakaway mechanism which is simple and economical.

The above objects, and others which will be apparent to those skilled in the art, are accomplished in a machine for forming a roll of crop material and having a mobile frame, means mounted to the frame defining a roll forming area and being movable and capable of concurrently imposing a given range of forces upon crop material at such area for rolling crop material into a roll and means mounted to the frame for delivering crop to the movable means, by providing improved means for causing the imposition of a given higher range of forces on the crop material by the movable means during initial stages of formation of the crop material roll by the movable means for facilitating the formation of a core of the crop material for the roll at such area having a density at least generally equal to the overall density of the roll.

More particularly, in a roll forming machine having a mobile frame, means mounted to the frame for picking up crop material, lower roll forming means mounted to the frame including means movable for conveying the picked up crop material in a predetermined direction, and upper roll forming means including an endless flexible apron mounted above the conveying means to define a roll-forming area therebetween and being movable into a direction opposite to the predetermined direction for rolling crop material therebetween at the roll-forming area and tension means mounted to the frame for biasing the flexible apron toward a contracted position, the tension means being yieldable to allow the flexible apron to progressively expand against the biasing as the crop material being rolled at the roll-forming area grows in diameter, the improvement comprises a mechanism mounted to the frame and capable of preventing the tension means from yielding which in turn prevents the flexible apron from expanding from its contracted position, until crop material being initially rolled at the roll forming area between the conveying means and the flexible apron builds into a core having a desired predetermined density, the predetermined density of the core being at least generally equal to the overall density of the remainder of crop material to be subsequently wound about the core to form the crop material roll, the mechanism being further capable of allowing the tension means to yield which in turn allows the flexible apron to expand when the core of crop material reaches the predetermined density.

Further, more particularly, the roll forming machines includes a take-up and expansion member mounted to the the frame and engaging the flexible apron and the tension means is connected to the take-up member so as to bias the take-up member toward a first position which in turn biases the flexible apron toward its contracted position, with the member being yieldably movable away from its first position to allow the flexible apron to progressively expand against the biasing as crop material being rolled at the area grows in diameter. Also, the improved mechanism comprises a breakaway mechanism mounted to the frame and engaging the take-up member to cause the member to initially retain the flexible apron substantially in its contracted position as crop material being initially rolled at the roll-forming area into a core builds to a desired predetermined density with the breakaway mechanism being capable of releasing its engagement with the take-up member when the core of crop material achieves the predetermined density.

Other objects and attainments of the invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purposes of illustration in order that others skilled in the art may fully understand the invention and the principles thereof and the manner of applying it in practical use so that they may modify it in various forms, each as may be best suited to the conditions of a particular use.

BRIEF DESCRIPTION OF THE DRAWINGS

In the course of the following detailed description reference will be frequently made to the attached drawings in which.

DETAILED DESCRIPTION OF THE INVENTION

The Machine Frame

Figure 1:
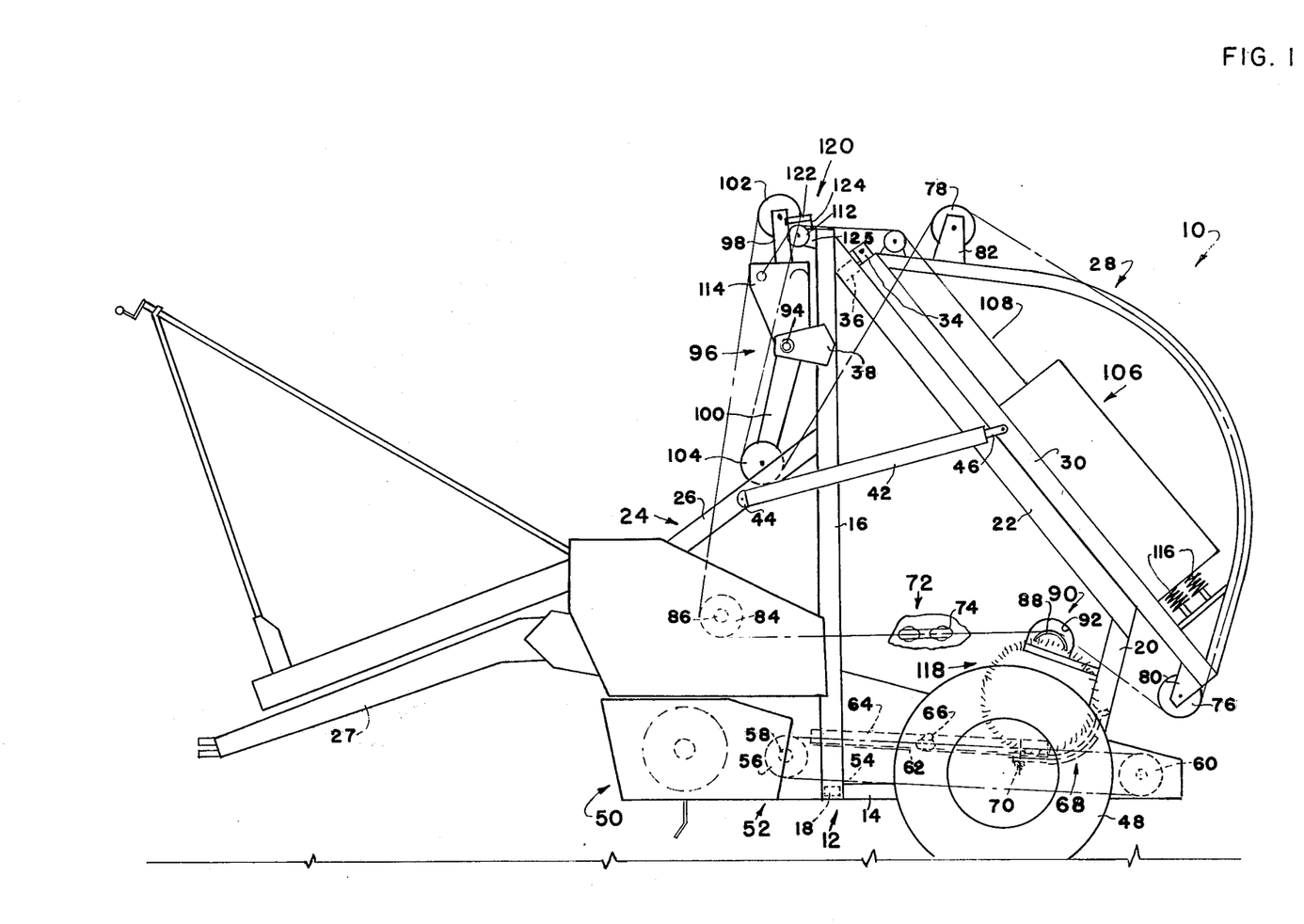
FIG. 1 is a side elevational view of a crop material roll forming machine incorporating a breakaway mechanism constructed in accordance with the principles of the present invention and showing the relative positions of the various parts of the machine as the crop material being rolled to form the core grows toward a desired predetermined density.
Figure 2:
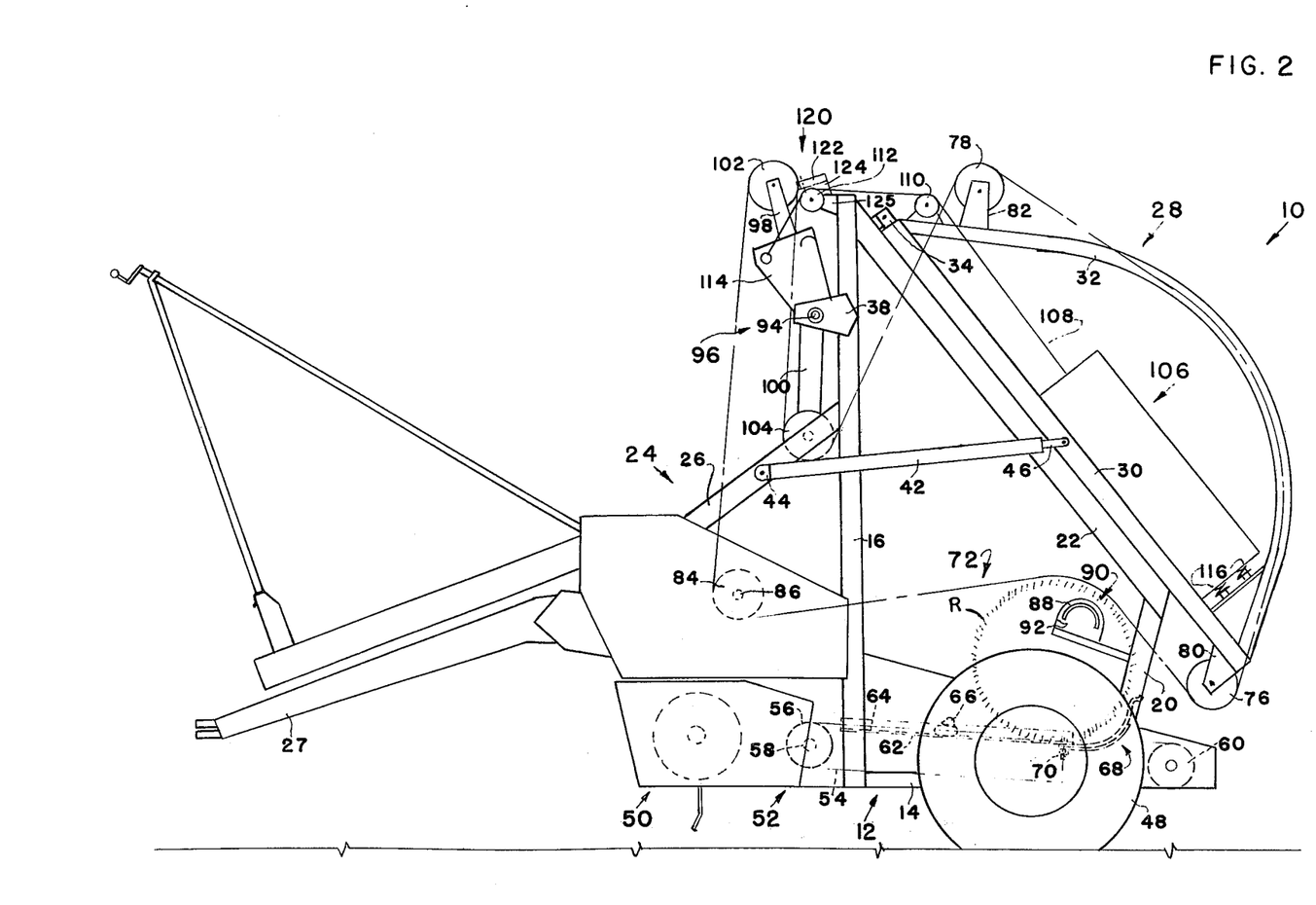
FIG. 2 is a view similar to FIG. 1 but showing the relative positions of the various parts of the machine after the initial core having the desired predetermined density has been formed and during the continued winding of additional crop material about the core.

Referring now to FIGS. 1 and 2, there is shown an improved crop roll forming machine, generally indicated by numeral 10, being provided with a base frame 12 having sides fixedly connected together, such as by welding or the like. Each side of the frame 12 has a bottom horizontal member 14. The forward end thereof is connected to a vertical member 16. Extending perpendicularly to the junction of the members 14 and 16 is a cross member 18, an end of which is fixedly connected to the junction of the members 14 and 16. A short frame member 20 extends upwardly from the rearward portion of the bottom member 14 and the upper end thereof is connected to one end of an upwardly and forwardly extending angular brace member 22, which is connected at its upper end to the upper end of the vertical member 16. Extending forwardly from the vertical member 16 at each side of the machine is a fixedly mounted A-frame (not completely shown), generally indicated by number 24, with an upper angular member 26 being shown fixedly connected at its rearward end to the front face of the vertical member 16. A tractor hitch tongue 27 is mounted to the forward end of the A-frame 24.

An upper frame, generally indicated by numeral 28, is provided with side frames each including a straight frame member 30, the ends of which are connected to the opposite ends of an arcuate frame member 32. The upper most portion of each side of the upper frame 28 is pivotally connected at 34 to a suitable bearing fixed to the upper end of the vertical frame member 16. A transverse frame member 36 extends between the upper ends of the angular brace members 22 of the base frame 12 to thereby stabilize the connection of the upper frame 28 at its pivotal connection 34. The upper end of the base frame 12 is further stabilized transversely by a bracing member (not shown) which extends between bearing brackets 38 which are fixedly connected to the front faces of the vertical frame members 16.

The lower rearward end of the upper frame 28 also has a cross frame member (not shown) extending between the opposite sides of the upper frame 28 generally at the connections between the lower ends of its straight frame members 30 and its arcuate frame members 32.

The upper frame 28 is pivotally moved counterclockwise from its lower, roll forming position, as shown in FIGS. 1 and 2, to an extended roll discharge position (not shown) by a pair of hydraulic cylinders, the left one of which is shown, being indicated by numeral 42. The hydraulic cylinders 42 have their cylinder ends 44 connected to the upper angular member 26 of the A-frame 24 and their piston ends 46 connected to the straight frame member 30 of the upper frame 28. Suitable hydraulic lines (not shown) are connected to the hydraulic cylinders 42 to simultaneously activate and control the operations of the cylinders 42 in retaining the upper frame 28 at its respective positions or moving the frame 28 between its positions.

The base frame 12 of the machine 10 has a pair of conventional wheels 48, the left one being shown, connected at opposite sides of the base frame 12 to a suitable conventional axle (not shown) in order that the crop roll forming machine 10 may be drawn by a tractor or other suitable pull-type vehicle over a field for purposes of forming a roll R of crop material, such as hay or similar forage material.

Roll Forming Components of the Machine

Extending forwardly from the front end of base frame 12 of the machine 10 is a pickup header 50. This header is adapted to engage, elevate and rearwardly feed a swath or windrow of forage material onto the crop material roll forming machine 10. The machine engaged by the header 50 is passed rearwardly from the entrance end of a lower apron generally indicated by numeral 52, towards the rear of the machine 10. The lower apron 52 comprises a conveying means having a series of endless, flexible chains 54 which are transversely spaced apart even distances and which extend around driven sprockets 56 rotatably mounted on a shaft 58 at the forward end of the hay rolling machine 10. The chains 54 also pass around idler sprockets 60 rotatably mounted at the rear of the machine 10. Mounted above the horizontal member 14 of the base frame 12 is a floor 62. The floor 62 is rigid and connected to the base frame 12 by a series of extending bars (not shown), the opposite ends of which are suitably connected to the horizontal member 14 of the base frame 12 to support the floor 62 in a horizontal position. The upper courses of the chains 54 slide in channels 64 on floor 62. These channels 64 are transversely spaced and suitably secured to floor 62 to support and guide the chains 54 across the floor 62 of the machine 10. The links of the chains 54 have lugs 66 connected thereto. The upper courses of the chains 54, as shown in FIGS. 1 and 2, move in a clockwise direction so that the leading edges of the lugs 66 engage and direct the material rearwardly across the floor 62 of the machine 10.

The rear most end of floor 62 contains a series of springs, being indicated by number 68. These springs 68 are plates which are heat treated to obtain an arcuate shape to extend up and away from the floor 62 of the machine 10, as shown in FIG. 1. These springs 68 comprise a series of plates placed behind each other so as to form a leaf spring arrangement. They are mounted between the channels 64 which contain the chains 54 thereby acting as a continuation of the floor 62 of the machine 10. The forward most end of each of the springs 68 is connected to the floor 62 by bolts 70. The outer or rear most ends of the springs 68 curve rearwardly and downwardly so as not to interfere with the roll forming or discharging operation of the roll forming machine 10. The spacing of the springs 68 from one another is sufficiently wide to permit the chains 54 and lugs 66 to project therethrough when the springs 68 are in a horizontal position. When the springs 68 are in their elevated or initial core forming position, as shown in FIG. 1, the chains 54 and the lugs 66 disappear below the springs 68 at the rear most end of floor 62. This movement of the lugs 66 below the springs 68 results in the lugs 66 disengaging the roll R of crop material as it is being formed, thereby enabling the springs 68 to engage and direct the material toward an upper apron, generally indicated by numeral 72, during the roll forming operation.

The upper frame 28 and certain guide sprockets which augment and support the upper apron 72 are shown in FIGS. 1 and 2. The upper apron preferably comprises a pair of endless flexible link type chains 74 (only the left one being shown) having, at longitudinally spaced intervals, bars (not shown) which extend between the chains 74 the full width of the machine 10. The bars may be square or of any other suitable geometric shape, such as cylindrical, for purposes of offering resistance to bending of the bars, especially when engaging the periphery of the roll R.

The upper apron 72 is supported and driven by various sprockets. At each side of the upper frame 28, guide sprockets 76 and 78, respectively, are supported by clevises 80 and 82 which are connected to the opposite ends of the upper frame 28. A portion of the upper course of the upper apron 72 extends partially about and is supported by the guide sprockets 76 and 78, and also the arcuate frame member 32, in the manner shown in FIGS. 1 and 2. Further, driving sprockets 84 are provided at each side of the base frame 14 and are connected to a driven shaft 86 that is supported in appropriate bearings fixed relative to the base frame 12. The lower course of the upper apron 72 extends partially about and is guidably supported by the driving sprockets 84, as well as slideably extending partially about and being guidably supported over an upper curved surface 88 of each of a pair of movable auxiliary guide members, indicated generally as numeral 90, being mounted respectively in opposite sides of the base frame 12. These auxiliary guide members 90 are spring loaded and are adapted to be retracted into accommodating spaces in the sides of the base frame 12 as the roll R of crop material grows in diameter so as not to interfere with the ends of the roll R as the roll is being formed. Therefore, as the roll R increases in diameter the auxiliary guide members 90 will be pushed through openings 92 so as not to interfere with the ends of the roll R.

The driven shafts 58 and 86, on which are mounted the sprockets 56 and 84 for respectively driving in clockwise and counterclockwise directions the lower and upper aprons 52 and 72, are interconnected to (through suitable gears not shown) and driven by the end of a power take-off unit (not shown) of the tractor utilized to pull the machine 10.

Take-Up And Expansion Member For The Upper Apron

A take-up and expansion member, generally indicated by numeral 96, for controlling contraction (take-up) and expansion of the upper apron 72 during formation of roll R and which operates as a pivotal supplemental frame, is mounted between the upper ends of vertical frame members 16. The take-up member 96 (only the left side being shown) is comprised by a shaft 94 which is rotatably supported in the bearing brackets 38 adjacent the upper ends of the vertical frame members 16 and a pair of oppositely extending arms 98 and 100 respectively affixed to each end of the shaft 94. The ends of the arms 98 and 100 respectively support rotatable guide sprockets 102 and 104 partially about which the endless chains 74 of the upper apron 72 extend in the manner shown in FIGS. 1 and 2.

Connected to the take-up and expansion member 96 is a spring and cable assembly, generally indicated by numeral 106, at each side of the machine 10. This assembly 106 at each side of the machine 10 includes a cable 108 which passes over a first pulley 110 rotatably mounted on each of the opposing sides of the upper frame 28 near its pivotally mounted end and then over a second pulley 112 rotatably mounted at the top end of each of the vertical frame members 16. The cable 108 has one end connected to a cam plate 114 on each side of the take-up and expansion member 96 which plate 114 is fixed to the arms 98 and 100 at each of the opposing ends of shaft 94. The cable 108 has the other end connected to enclosed dual tension springs 116. The enclosed springs 116 are mounted on each exterior side of the upper frame 28 so as to exert a desired level of tension on each of the cables 108 to retard the rotational movement of the take-up and expansion member 96 in a counterclockwise direction or, in other words, to impose a bias on the member 96 tending to cause rotation of the member 96 in a clockwise direction. Therefore, the biasing of the member 96 tends to move the upper apron 72 to a contacted position as shown in FIG. 1 and away from an expanded position which the upper apron 72 is shown moving toward in FIG. 2. As shown in FIG. 2, once an initial core of the roll R has been formed at a roll-forming area, generally indicated as numeral 118, defined between the rearward ends of the upper and lower courses respectively of the lower and upper aprons 52 and 72 and the opposite sides of the base frame 12, the take-up and expansion member 96 will yieldably rotate in a counterclockwise direction and allow the upper apron 72 to progressively expand against the biasing of the member 96 as more crop material is rolled about the core of the roll R and the roll R thereby grows in diameter. In such manner, the upper apron 72 is maintained in pressurized contact with the roll R of crop material, at the desired level of tension imposed on the member 96 by the assembly 106, as the roll R is being formed so that a particular density of the crop material within the roll R can be obtained, for example approximately ten pounds per square foot. However, it has been found that the aforementioned manner of biasing the upper apron 72 by the member 96 in combination with the assembly 106, fails to form the crop material into an initial solid core having a sufficiently high enough density whereby the roll as finally formed will be somewhat "spongy" at the center which prevents the formation of a roll having the aforementioned desired overall density.

Breakaway Mechanism

In order to achieve formation of a solid core of crop material having the desired predetermined density, such being generally equal to, or greater than, that of the remainder of the crop material which is wound therearound to form the roll through the aforementioned biasing of the upper apron 72 by the take-up member 96 with the assembly 106 associated therewith, there is provided a breakaway mechanism, generally indicated by numeral 120, (only the left side of the mechanism being shown) which may be adjustably preset to cause the application of a desired higher level of tension to the upper apron 72 during the formation of the initial core of the crop material, as shown in FIG. 1.

As shown in FIGS. 1 and 2, and more clearly in FIGS. 3–7, the breakaway mechanism 120 comprises a latch arm 122 mounted at one end to a support brace 124 which is fixed to the top of a bracket 125 extending forwardly from the upper end of each of the vertical members 16 which bracket 125 rotatably mounts the second pulley 112 of the springs and cable assembly 106.

The one end of the latch arm 122 is attached to the brace 124 by a fastener 126 which also mounts two washers 128 between the latch arm 122 and the brace 124 in order to offset the one end of the latch arm 122 from the surface 130 of the brace 124 facing the latch arm 122. Also, sufficient clearance is provided between the one end of the latch arm 122 and the adjacent one of the washers 128 to allow the latch arm 122 to be pivotal about the fastener 126 toward and away from the surface 130 of the brace 124.

The opposite end of the latch arm 122 extends beyond the outer end of the brace 124 and has first detent means thereon, preferably in the form of a V-shaped bent section 132 of the latch arm 122.

The upper arm 98 of the take-up and expansion member 96 includes second detent means therein preferably being comprised by a channel 134 being defined by the U-shaped cross-section of the arm 98. When the member 96 is disposed in its generally vertical, initial position, as shown in FIGS. 1 and 3, the arm 98 is located adjacent to the latch arm 122 and the V-shaped bent section 132 thereof may be received within the channel 134 of the arm 98.

Figure 6:
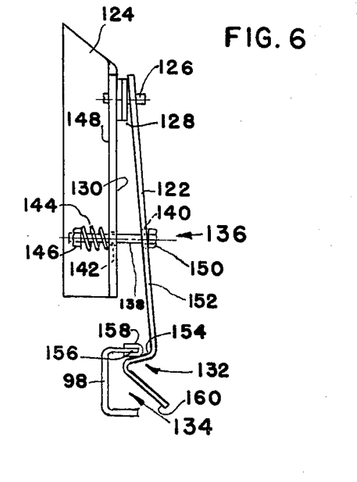
FIG. 6 is an enlarged fragmentary top plan view as seen along line 6—6 of FIG. 3 showing the breakaway mechanism engaged with the take-up member.

Adjustable biasing means, generally indicated by numeral 136, biases the latch arm 122 toward the surface 130 of the brace 124 and thereby retains the V-shaped bent section 132 of the latch arm 122 within the channel 134 of the arm 98, as shown in FIG. 6. The biasing means 136 comprises a bolt 138 disposed through a hole 140 defined in the latch arm 122 intermediately between its ends and then on through another aligned hole 142 formed through the brace 124. A spring 144 is mounted on the bolt 138 between a nut 146 disposed on the threaded end of the bolt 138 and a surface 148 of the brace 124 on the reverse side thereof from the surface 130. A head 150 of the bolt 138 engages an outer surface 152 of the latch arm 122 which surface 152 faces away from the surface 130 of the brace 124. The level of biasing force applied to the latch arm 122 may be adjustably varied by turning the nut 146 further onto the bolt 138 or vice versa.

When the take-up member 96 is disposed at its initial position of FIG. 1 with the V-shaped bent section 132 of the latch arm 122 received within the channel 134 of the upper arm 98 of the take-up member 96, an inner cam surface 154 of the bent section 132, preferably disposed at an angle of approximately 100° to the remainder of the latch arm 122 and thus to the plane of rotation of the member 96, forceably engages a side edge portion 156 of the upper arm 98 (which comprises a side of the channel 134), as shown in FIG. 6. The edge portion 156 preferably has a wear plate 158 secured thereon for minimizing frictional wear on the upper arm 96 incurred during engagement and disengagement of the bent section 132 with and from the upper arm 96. However, the wear plate 158 may be omitted. Further, the cam surface 154 forms an angle of approximately 10° with the plane of edge portion 156.

Figure 3:
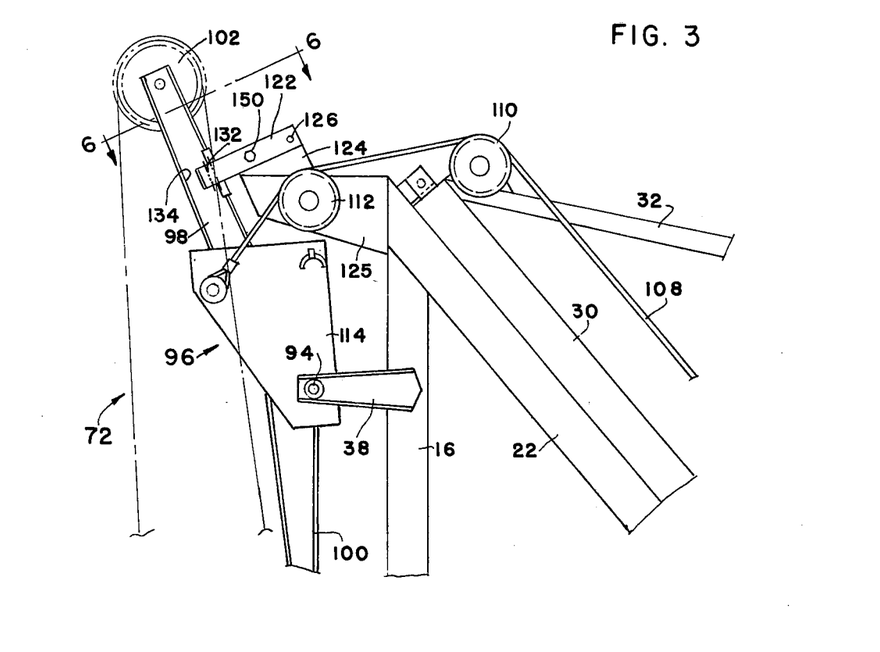
FIG. 3 is a fragmentary side elevational view on a larger scale than in FIG. 1 and showing the initial relative positions of the breakaway mechanism and the take-up member of the machine during formation of the initial core of crop material.
Figure 4:
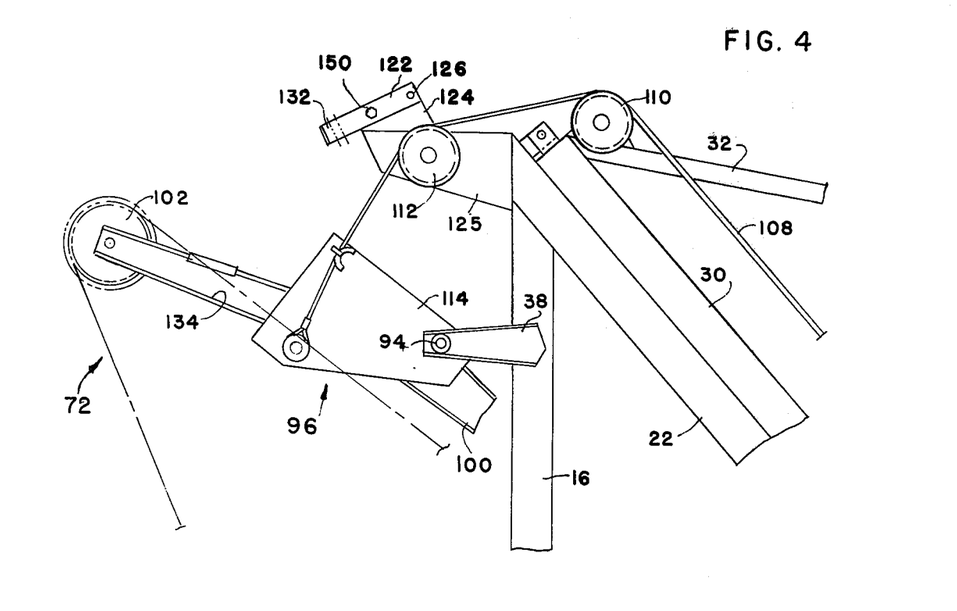
FIG. 4 is a fragmentary side elevational view on a larger scale than in FIG. 2 and showing the relative positions of the breakaway mechanism and the take-up member of the machine after the initial core of the roll of crop material has been formed and the take-up member released from the breakaway mechanism.
Figure 5:
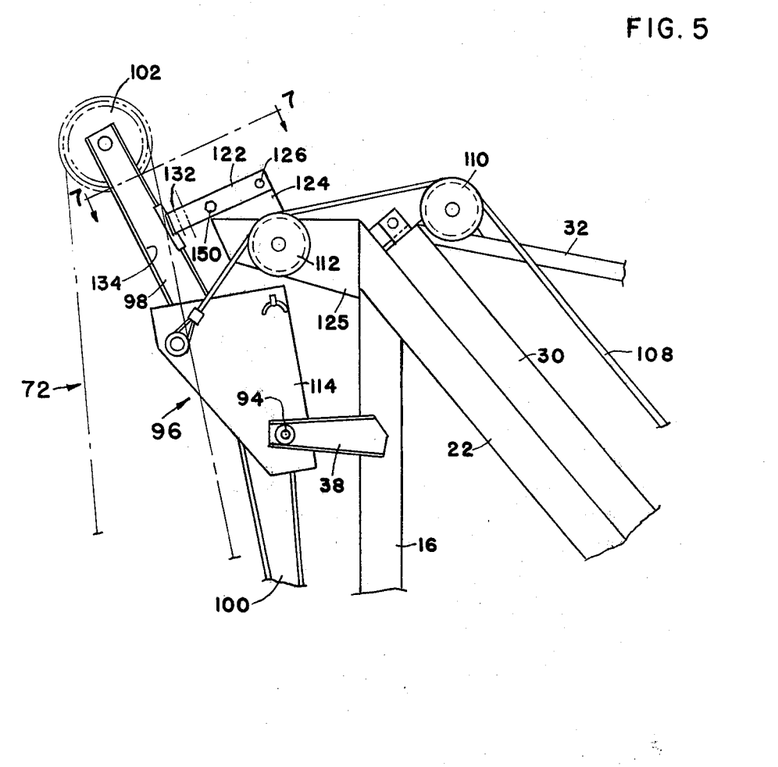
FIG. 5 is a view similar to FIG. 3 but showing the relative positions of the breakaway mechanism and the take-up member during resetting of the engagement of the breakaway mechanism with the take-up member after a completed roll has been ejected from the machine.
Figure 7:
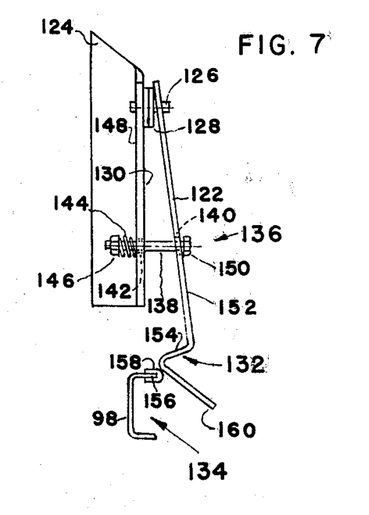
FIG. 7 is a view similar to FIG. 6 but showing the breakaway mechanism during resetting of its engagement with the take-up member as seen along line 7—7 of FIG. 5.

When the upper arm 98 has been disengaged from the latch arm 122, a completed roll has been ejected from the rear of the machine 10, and the take-up member 96 is being automatically pulled back to its initial engaged position of FIGS. 1 and 3 with the latch arm 122 by the spring and cable assembly 106 to return to the upper apron 72 to its initial contracted position, an outer cam surface 160 of the bent section 132 is forceably engaged by the side edge portion 156 of the upper arm 98 at the wear plate 158, thereon as shown in FIG. 7, and the latch arm 122 is pivoted or deflected outwardly until the edge portion 156 of the upper arm 98 passes the bent section 132 at which time the bent section 132 resets within the channel 134 of the upper arm 98. The outer cam surface 160 of the bent section 132 of the latch arm 122 forms an angle of preferably between approximately 30° to 45° with the remainder of the latch arm 122 and thus with the plane of rotation of the member 96 whereby substantially less pulling force is required to overcome the biasing force of the spring 144 on the latch arm 122 to reset of the bent section 132 within the channel 134 of the upper arm 98 than to originally outwardly deflect or pivot the latch arm 122 to disengage the bent section 132 from the channel 134 of the upper arm 98 during the roll forming operation. Further, the outer cam surface 160 forms an angle of approximately 45° to 60° with the plane of edge portion 156.

Preferably, in actual practice, the pulling force imposed on the take-up member 96 at each side of the machine 10 by the dual springs 116 and thus on the upper apron 72 desirably translates into an initial level of apron tension or force being imposed on crop material of approximately 350 pounds which increases during the roll forming operation to approximately 700 pounds as the springs 116 elongate. As stated hereinbefore, the aforementioned initial level of apron tension or force being imposed on the crop material fails to achieve an initial core for the roll having a great enough density to provide a solid foundation about which to wind the additional crop material to an overall density of approximately ten pounds per square foot. The breakaway mechanism 120, described in detail hereinbefore, imposes additional pulling force on the take-up member 96 at each side of the machine 10, and thus on the upper apron 72, which translates into an additional range of apron tension or force being imposed on the crop material of approximately 300 to 600 pounds and retains the upper apron 72 in its initial contracted position until an initial core of crop material is formed having a desired predetermined density substantially greater than heretofore possible and correspondingly ranging from generally equal to the density of the remainder of the crop material which is subsequently wound about the core to substantially greater than the density of the remainder of crop material which is subsequently wound about the core. The biasing force of the spring 144 may be adjustably preselected, by turning the nut 146 on the bolt 138, to vary the amount of additional pulling force imposed on the take-up member 96 by the breakaway mechanism 120 and thereby preselect the desired additional pounds of apron tension or force to be imposed on the crop material during formation of the core of the roll which in turn preselects the desired predetermined level of density of the core within the aforementioned density range. When the desired level of core density is reached, the reverse pulling force being imposed on the upper apron 72 by the core of crop material will exceed the aforementioned combined pulling forces caused by dual springs 116 and spring 144 and cause the breakaway mechanism 120 to trip or disengage from the take-up member 96 whereby the upper apron 72 will be allowed to progressively expand as the take-up member 96 yieldably moves in a counterclockwise direction and the roll continues to grow in diameter, as shown in FIG. 2.

It is thought that the invention and many of its attendant advantages will be understood from the foregoing description and it will be apparent that various changes may be made in the form, construction and arrangement of the parts without departing from the spirit and scope of the invention or sacrificing all of its material advantages, the form hereinbefore described being merely a preferred or exemplary embodiment thereof.

Having thus described the invention, what is claimed is:

1. In a machine for forming a roll of crop material and having a mobile frame, means mounted to said frame for picking up crop material, lower roll forming means mounted to said frame including means movable for conveying said picked up crop material in a predetermined direction, and upper roll forming means including an endless flexible apron mounted above said conveying means to define a roll-forming area therebetween and being movable in a direction opposite to said predetermined direction for rolling crop material therebetween at said area, a take-up and expansion member mounted to said frame and engaging said flexible apron and tension means attached to said frame and connected to said member so as to bias said member toward a first position which in turn biases said flexible apron toward a contracted position, said member being yieldably movable away from said first position to allow said flexible apron to progressively expand against said biasing as said crop material being rolled at said area grows in diameter, the improvement which comprises:

a breakaway mechanism mounted to said frame and capable of engaging said take-up and expansion member when at its first position so as to prevent said member from yieldably moving away from said first position, which in turn prevents said flexible apron from expanding from its contracted position, until crop material being initially rolled at said roll-forming area between said conveying means and said flexible apron builds into a core having a desired predetermined density, said predetermined density being at least generally equal to the overall density of the remainder of crop material to be subsequently wound about said core to form said roll, said breakaway mechanism being further capable of releasing its engagement with said take-up member when said core of crop material reaches said predetermined density.

2. A crop material roll forming machine as recited in claim 1, wherein:

said upper roll forming means further includes an upper frame movably mounted to said mobile frame and coupled with said flexible apron, said upper frame being movable relative to said mobile frame between a roll forming position in which it operatively positions said flexible apron for roll forming operation with said conveying means and a roll discharge position in which it allows ejectment of said roll from said machine; and said breakaway mechanism is capable of resetting into engagement with said take-up and expansion member after said roll has been formed and after movement of said upper frame to its roll discharge position.

3. A crop material roll forming machine as recited in claim 1, wherein:

said take-up member includes first detent means;

said breakaway mechanism includes latching means having second detent means capable of mating with said first detent means when said member is disposed at said first position; and biasing means is provided, being associated with one of said member and said mechanism, for causing mating between said first and second detent means at a predetermined level of engagement force when said member is disposed at said first position, said biasing means being capable of yielding to allow said first and second detent means to unmate and provide release of said mechanism from said member when said core has been rolled.

4. A crop material roll forming machine as recited in claim 3, wherein said biasing means include adjustment means for preselecting the engagement force level of said mating between said first and second detent means and, thereby, the predetermined density of said core at which said mechanism will release from said member.

5. A crop material roll forming machine as recited in claim 1, wherein said member includes a shaft mounted on said frame for rotation about an axis extending transverse to the direction of movement of said conveying means and said upper flexible apron and a pair of first and second arms attached to each of the opposing ends of said shaft, said arms of each pair extending outwardly from said respective shaft end in generally opposite directions and generally perpendicular to said axis of said shaft and being respectively engaged with spaced apart portions of one of two opposite sides of said upper apron, said corresponding first arms of said pairs of arms having first detent means formed therein: and said breakaway mechanism includes a pair of latch arms, each latch arm having one end pivotally mounted on said frame at one of two opposite sides thereof and an opposite end having second detent means formed thereon capable of mating with said first detent means of one of said first arms of said member when said member is disposed at said first position, said mechanism further including a pair of resilient spring biasing means, each spring biasing means coupling one latch arm between its ends with one of said sides of said frame and causing mating between said first and second detent means at a predetermined level of engagement force when said member is disposed at said first position, each spring biasing means being capable of yielding to allow pivotal movement of said one latch arm and unmating of said first and second detent means to provide release of said mechanism from said member when said core has been rolled.

6. A crop material roll forming machine as recited in claim 5, wherein each of said pair of spring biasing means includes adjustment means for preselecting the engagement force level of said mating between said first and second detent means and, thereby, the predetermined density of said core at which said mechanism will release from said member.

* * * * *